(12) United States Patent
Rouhana

(10) Patent No.: US 10,819,223 B2
(45) Date of Patent: Oct. 27, 2020

(54) METHOD FOR CONTROLLING A THREE-PHASE VIENNA RECTIFIER

(71) Applicant: RENAULT s.a.s., Boulogne-Billancourt (FR)

(72) Inventor: Najib Rouhana, Compiegne (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 16/610,735

(22) PCT Filed: May 24, 2018

(86) PCT No.: PCT/FR2018/051228
§ 371 (c)(1),
(2) Date: Nov. 4, 2019

(87) PCT Pub. No.: WO2018/229378
PCT Pub. Date: Dec. 20, 2018

(65) Prior Publication Data
US 2020/0169165 A1 May 28, 2020

(30) Foreign Application Priority Data

Jun. 15, 2017 (FR) .................................. 17 55421

(51) Int. Cl.
*H02M 1/42* (2007.01)
*H02M 1/12* (2006.01)
(Continued)

(52) U.S. Cl.
CPC .......... *H02M 1/4216* (2013.01); *H02M 1/12* (2013.01); *H02M 7/219* (2013.01); *H02M 7/5395* (2013.01); *H02M 2007/2195* (2013.01)

(58) Field of Classification Search
CPC ...... H02M 1/4216; H02M 1/12; H02M 7/219; H02M 7/5395; H02M 2007/2195
See application file for complete search history.

(56) References Cited

U.S. PATENT DOCUMENTS

2003/0128563 A1   7/2003  Rojas Romero
2013/0083571 A1*  4/2013  Pu ......................... H02M 1/126
                                               363/44

FOREIGN PATENT DOCUMENTS

WO        WO 01/47094 A2    6/2001

OTHER PUBLICATIONS

International Search Report dated Sep. 10, 2018 in PCT/FR2018/051228 filed on May 24, 2018.
(Continued)

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

A method for controlling a three-phase Vienna rectifier, including a plurality of controlled power switches, each associated with an electrical phase; the method including: transforming three provided reference line voltages into three phase voltages; calculating a homopolar component to be injected according to the sign of the phase voltage values and to the average value of the phase currents of the three-phase Vienna rectifier; calculating "modulating" values for each phase of the three-phase Vienna rectifier according to the calculated homopolar component to be injected and the three phase voltages; and generating six signals for switching the controlled power switches, according to the sign of the phase currents of the three-phase Vienna rectifier and the "modulating" values that were calculated.

7 Claims, 4 Drawing Sheets

(51) Int. Cl.
    H02M 7/219      (2006.01)
    H02M 7/5395     (2006.01)

(56) References Cited

OTHER PUBLICATIONS

Preliminary French Search Report dated Feb. 6, 2018 in French Application No. 1755421 filed on Jun. 15, 2017.
Ide, P. et al., "Investigation of Low Cost Control Schemes for a selected 3-level Switched Mode Rectifier", Telecommunications Energy Conference, 1997, INTELEC 97., $19^{th}$ International, Melbourne, Vic., IEEE, pp. 413-417, XP010261385.
Gules, R. et al., "A Switched-Mode Three-Phase Three-Level Telecommunications Rectifier", INTELEC '99. $21.^{st}$. International Telecommunications Energy Conference, IEEE, 1999, 7 total pages, XP000868436.

* cited by examiner

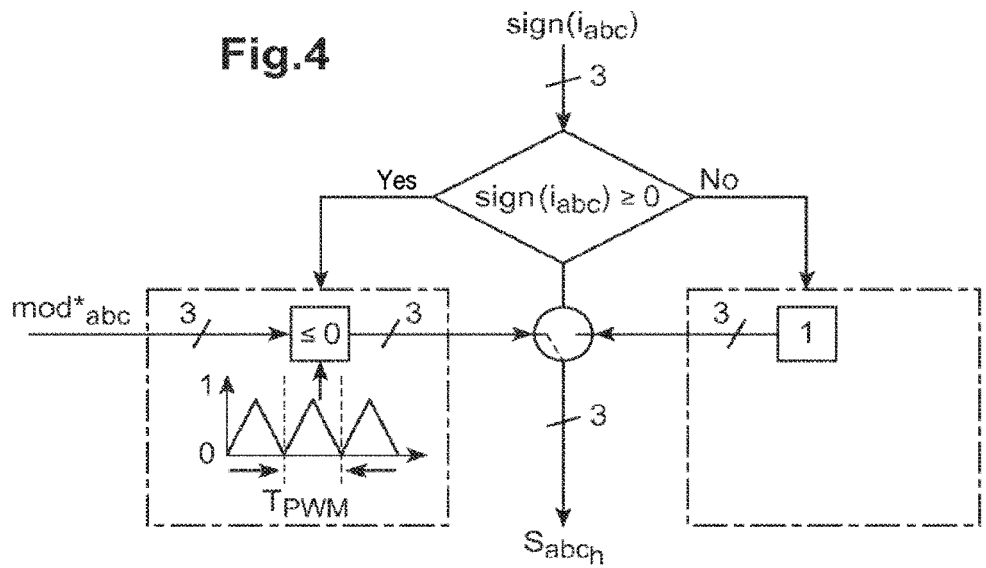
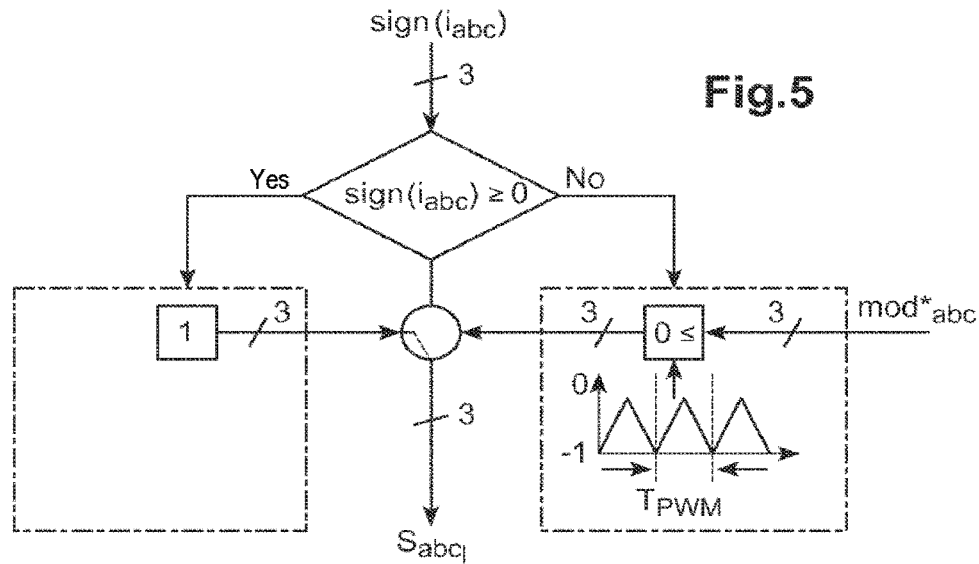

METHOD FOR CONTROLLING A THREE-PHASE VIENNA RECTIFIER

The present invention relates to a method for controlling a three-phase rectifier for a three-phase input charging device, comprising an isolated AC-to-DC (alternating current to direct current) converter. Such a charging device is particularly suitable for use as a device on board an electric or hybrid motor vehicle.

These vehicles are fitted with high-voltage electric batteries and generally comprise onboard chargers, i.e. electric battery charging devices that are directly mounted on the vehicles. The main function of these charging devices is to recharge batteries from electricity available from the electrical power distribution grid. They therefore convert an alternating current into a direct current. The desired criteria for charging devices, and more specifically for onboard chargers, are high efficiency, compactness, galvanic isolation, good reliability, operating safety, low emission of electromagnetic interference and a low harmonic content on the input current.

This relates to the category of three-phase input charging devices, which have a higher charging power compared to single-phase input charging devices. FIG. 1 shows a known layout of an isolated charging device 10 on board an electric or hybrid vehicle for recharging the high-voltage battery of the vehicle from the three-phase electrical power supply network 30, to which the onboard charging device 10 is connected by means of the line impedance 40 of the network.

In order to implement the AC-to-DC conversion function with galvanic isolation, the use of a charging device 10 is known that comprises a first AC-to-DC converter that comprises a power factor correction (PFC) circuit 20 in order to limit the input current harmonics and a second DC-to-DC (direct current to direct current) converter 12 for controlling the charge and also for providing the isolation function for operating safety. An input filter 13 is conventionally incorporated at the input of the onboard charging device 10, upstream of the PFC circuit 20 relative to the three-phase electrical power supply network 30.

The PFC circuit 20 is controlled by an integrated controller (not shown), which analyzes and performs real-time correction of the rate of the current relative to the voltage. It deduces form errors therefrom by means of a comparison with the rectified sine wave of the voltage and it corrects them by controlling the amount of power by virtue of high-frequency splitting and power storage in an inductor. More specifically, its purpose is to obtain a current that is not out of phase and is as sinusoidal as possible at the input of the power supply of the charger.

For the PFC circuit 20, it is known practice, in particular from the prior art document CN 104811061, to implement a three-level three-phase rectifier with three switches, commonly called a three-phase Vienna rectifier, such as described in the prior art document EP94120245 and in FIG. 2.

The selection of this layout is actually particularly advantageous with respect to performance levels for the power factor correction.

In a three-phase Vienna rectifier 20, each phase of the three-phase alternating input voltage 30 is connected by respective inductors La, Lb, Lc to a switching arm 1, 2, 3 of the rectifier 20, which is provided with a cell of power switches Sa, Sb, Sc, respectively.

The cells of power switches Sa, Sb, Sc are each arranged between a respective inductor La, Lb, Lc and a midpoint O between the two output voltages Vdch and Vdcl of the rectifier 20, respectively corresponding to the voltage on a first output capacitor C1 connected between the midpoint O and a positive power supply line H and to the voltage on a second output capacitor C2 connected between the midpoint O and a negative power supply line L.

In general, in order to control such a Vienna rectifier 20, the voltages and the currents at the input of each switch Sa, Sb, Sc and at the output of the rectifier are measured and control loops are used that allow the duty cycles required for controlling the average conduction time of the switches Sa, Sb, Sc to be generated.

The prior art on the application of the duty cycles to each switching arm of a three-phase Vienna rectifier consists in using one or the other of the two switches depending on the direction in which the current is flowing over the arm.

However, the methods known from the prior art for generating the duty cycles of the Vienna rectifier 20 give rise to fluctuating voltages across the terminals of the output capacitors C1, C2, which make regulating the DC-to-DC converter 12 relatively complex and unreliable.

Therefore, a solution is sought for improving the regulation of the DC-to-DC converter 12 by making it simpler and more robust.

What is proposed is a method for controlling a three-phase Vienna rectifier, comprising a plurality of controlled power switches that are each associated with one electrical phase; the method comprising:
  a step of transforming three supplied setpoint phase-phase voltages into three phase-neutral voltages;
  a step of calculating a homopolar component to be injected according to the values and the signs of the phase-neutral voltages and the average values of the phase currents of the three-phase Vienna rectifier;
  a step of calculating a modulant value for each phase of the three-phase Vienna rectifier according to the calculated homopolar component to be injected and the three phase-neutral voltages; and
  a step of generating six signals for switching the controlled power switches according to the sign of the phase currents of the three-phase Vienna rectifier and the calculated modulant values.

Thus, by switching the controlled power switches according to the generated signals, the input currents for the two DC-to-DC converters are rendered constant and balanced, thereby allowing the DC-to-DC converter to be regulated more simply and robustly.

Advantageously and nonlimitingly, the operation of calculating the homopolar component (f(3wt)) comprises applying the following equation:

$$f(3wt) = v_z^* = \frac{\sigma_a \cdot (v_a^* \times \langle i_a \rangle) + \sigma_b \cdot (v_b^* \times \langle i_b \rangle) + \sigma_c \cdot (v_c^* \times \langle i_c \rangle)}{-(\sigma_a \cdot \langle i_a \rangle + \sigma_b \cdot \langle i_b \rangle + \sigma_c \cdot \langle i_c \rangle)}$$

wherein $\sigma_{x=a,b,c} = \text{sign}(v^*_{x=a,b,c})$ according to the values from the following table:

| Condition | $\sigma_a$ | $\sigma_b$ | $\sigma_c$ |
|---|---|---|---|
| $v_a^* \geq 0, v_b^* < 0$ and $v_c^* < 0$ | + | − | − |
| $v_a^* \geq 0, v_b^* < 0$ and $v_c^* < 0$ | + | + | − |
| $v_a^* \geq 0, v_b^* < 0$ and $v_c^* < 0$ | − | + | − |

-continued

| Condition | $\sigma_a$ | $\sigma_b$ | $\sigma_c$ |
|---|---|---|---|
| $v_a^* \geq 0$, $v_b^* < 0$ and $v_c^* < 0$ | − | + | + |
| $v_a^* \geq 0$, $v_b^* < 0$ and $v_c^* < 0$ | − | − | + |
| $v_a^* \geq 0$, $v_b^* < 0$ and $v_c^* < 0$ | + | − | + |

Thus, the homopolar component to be injected may be calculated by using the signs of the phase-neutral voltages, the values of phase-neutral voltages and the average values of phase currents, thereby allowing a calculation that is very fast and economical in terms of processing time, for example using a processor.

Advantageously and nonlimitingly, each modulant value is calculated by adding the homopolar component to the associated phase-neutral voltage. This allows the modulant values to be calculated quickly and straightforwardly, in particular because no trigonometric or vector calculation is involved.

Advantageously and nonlimitingly, the operation of generating the six signals for switching the controlled power switches comprises comparing the modulant values with two high-frequency carriers that are synchronized and in phase with one another.

Thus, the operation of generating the switching signals is simplified by comparing the calculated modulant values with high-frequency carriers in a straightforward manner.

Advantageously and nonlimitingly, for each phase of the Vienna rectifier, if the phase current is positive, the modulant associated with the phase is compared with a symmetrical triangle-wave signal varying between 0 and +1.

Advantageously and nonlimitingly, for each phase of the Vienna rectifier, if the phase current is negative, the modulant associated with the phase is compared with a symmetrical triangle-wave signal varying between −1 and 0. The latter is in phase with the symmetrical triangle-wave signal varying between 0 and 1.

The preceding two comparison operations afford one and the same advantage of providing a logic comparison that is straightforward to perform using a quickly generated triangle-wave signal.

The invention also relates to a device for controlling a three-phase Vienna rectifier comprising means for implementing the method as claimed in any one of the preceding claims.

Other particularities and advantages of the invention will become apparent upon reading the following description of one particular embodiment of the invention provided by way of nonlimiting indication and with reference to the appended drawings, in which:

FIG. 4 is a schematic representation of one step of generating the signals for switching the controlled power switches of the Vienna rectifier, according to the embodiment of FIG. 3; and FIG. 5 is a schematic representation of another step of generating the signals for switching the controlled power switches of the Vienna rectifier, according to the embodiment of FIG. 3.

FIG. 2 shows the structure of a three-phase Vienna rectifier 20 known from the prior art, as is used in the invention.

Figure 1:
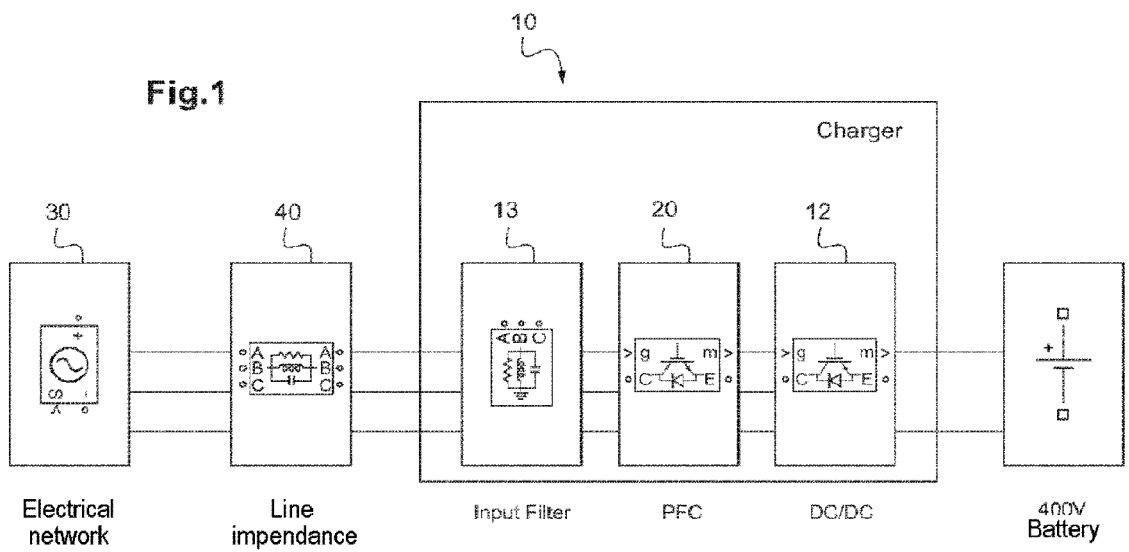
FIG. 1 shows a voltage converter implementing a method according to one embodiment of the invention shown in FIG. 3.
Figure 2:
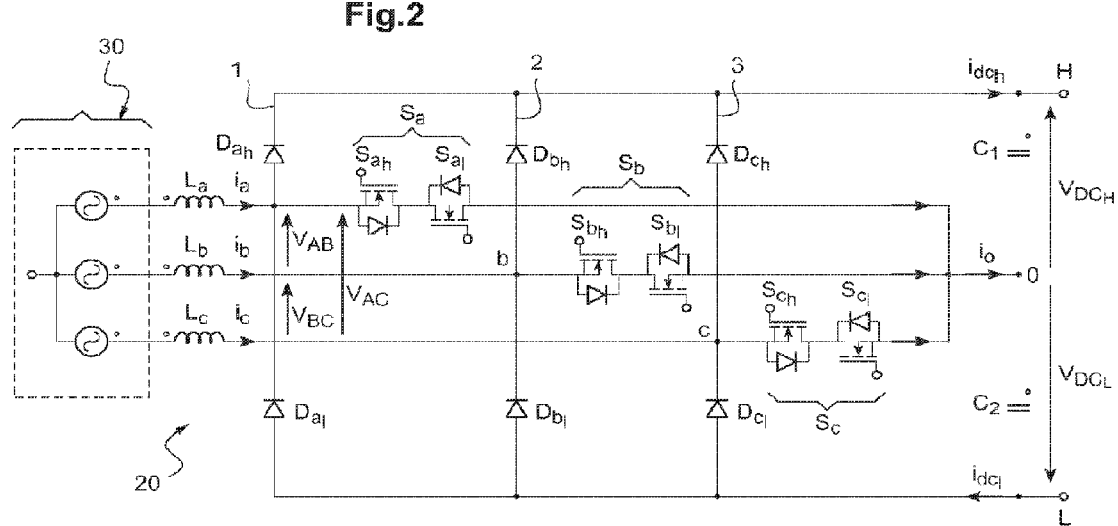
FIG. 2 shows a three-phase Vienna rectifier known from the prior art.
Figure 3:
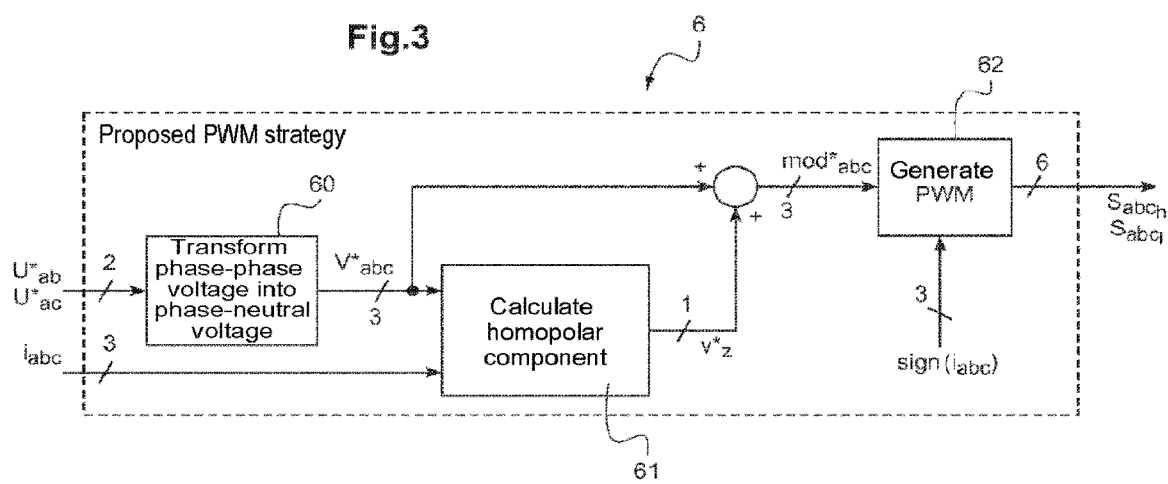
FIG. 3 is a schematic representation of one embodiment of the invention.

The three-phase Vienna rectifier 2 comprises three parallel input connections each coupled to a phase of a three-phase electrical power supply network 30 by means of a series inductor coil La, Lb, Lc and each connected to a pair of switches Sa, Sb, Sc forming a first, a second and a third switching arm of the three-phase Vienna rectifier.

Each pair of switches Sa, Sb, Sc comprises a head-to-tail series assembly formed by a first corresponding switch Sah, Sbh, Sch, which is controlled when a corresponding input current Ia, Ib, Ic is positive, and by a second corresponding switch Sal, Sbl, Scl, which is controlled when the corresponding input current is negative. In other words, a single switch, controlled on a switching branch, is used for the chopping of the current. The switches are formed by semiconductor components controlled on closure and on opening, such as, for example, SiC-MOS (silicon carbide metal-oxide-semiconductor) transistors, connected in anti-parallel with a diode. Semiconductors of this type are suited to very high chopping frequencies. The switches Sah, Sbh, Sch are also called high switches and the switches Sal, Sbl, Scl are called low switches.

The three-phase Vienna rectifier 20 also comprises three parallel branches 1, 2 and 3 each comprising two diodes Dah and Dal, Dbh and Dbl and Dch and Dcl, which form a six diode three-phase bridge allowing a unidirectional transfer of power and the rectification of the current and the voltage taken from a three-phase electrical power supply network 30.

Each input of the three-phase Vienna rectifier 20 is connected, by a respective parallel input connection, to a connection point located between two diodes of one and the same branch 1, 2 and 3.

The two common ends of the branches 1, 2 and 3 form two, positive H and negative L, output terminals H and L, respectively, of the three-phase Vienna rectifier 20, which terminals are intended to be coupled to the DC-to-DC device 12.

The switching arms Sa, Sb, Sc of each phase are also each respectively connected between the connection point a, b, c located between the two diodes of the first 1, second 2 and third 3 branches and a midpoint O of the output voltages $V_{DCH}$ and $V_{DCL}$ of the three-phase Vienna rectifier 20, respectively corresponding to the voltage on an output capacitor C1 between the positive output terminal H of the three-phase rectifier and the midpoint O and to the voltage on an output capacitor C2 between the midpoint O and a negative output terminal L of the three-phase rectifier 20.

The voltage on the output capacitors C1, C2 is independently feedback-controlled by the DC-to-DC converter of the charging device connected at the output of the three-phase Vienna rectifier 20, according to the overall layout illustrated in FIG. 1. In other words, the output voltages of the three-phase Vienna rectifier 20 are controlled by the DC-to-DC converter 12.

The three-phase Vienna rectifier 20 inserted at the input of the charger power supply 10 acts to correct the power factor of the charger. Such a role allows the interfering currents (harmonics) produced by the charger to be prevented from flowing through the impedance of the network located upstream of the Vienna rectifier 20.

The switching arms Sa, Sb and Sc of each phase of the three-phase network 30 are controlled by means of six PWM (pulse width modulation) control signals with a variable duty cycle at a fixed chopping frequency equal to 140 kHz that are individually controlled by processing means such as an FPGA, for example (not shown) for high sampling frequencies.

Thus, the processing means are suitable for determining the duty cycles of the signals for controlling the switching of the switches of the switching arms of the rectifier, which are required for feedback-controlling the sinusoidal currents at the input of the rectifier.

The invention relates to a method for controlling the processing means for applying duty cycles that are suitable for both decreasing, as far as possible, the ripple of the currents at the input of the two capacitors C1 and C2 and balancing these currents so as to deliver equal power over the two DC buses at the output of the Vienna rectifier 20, thereby allowing the regulation of the DC-to-DC converter 12 to be rendered more robust following the minimization of the ripple of the current at the input of the DC-to-DC converter. Specifically, when the power flow downstream of the Vienna rectifier 20 is constant, the voltage feedback-control of the DC-to-DC converter 12 is simpler.

It is sought here to balance, in terms of average value, the input currents $i_{dch}$ and $i_{dcl}$ upstream of the top C1 and bottom C2 capacitor, respectively.

The currents denoted by $i_{dch}$ and $i_{dcl}$, respectively, are expressed in terms of instantaneous value as a function of the currents in each phase in the following manner:

$$i_{dch} = (D_{a_h} \times i_a) + (D_{b_h} \times i_b) + (D_{c_h} \times i_c) \quad (1)$$

$$i_{dcl} = (D_{a_l} \times i_a) + (D_{b_l} \times i_b) + (D_{c_l} \times i_c) \quad (2)$$

where $D_{a_{h,l}} = (1 - S_{a_{h,l}})$, $D_{b_{h,l}} = (1 - S_{b_{h,l}})$ and $D_{c_{h,l}} = (1 - S_{c_{h,l}})$ such that $S_{a_{h,l}} = \{0,1\} = S_{b_{h,l}} = S_{c_{h,l}}$ represent the signals for switching the high and low semiconductors of each phase.

From this starting point, equations (1) and (2) are expressed as follows:

$$i_{dch} = ((1 - S_{a_h}) \times i_a) + ((1 - S_{b_h}) \times i_b) + ((1 - S_{c_h}) \times i_c) \quad (3)$$

$$i_{dcl} = ((1 - S_{a_l}) \times i_a) + ((1 - S_{b_l}) \times i_b) + ((1 - S_{c_l}) \times i_c) \quad (4)$$

By calculating the average value of equations (3) and (4), in one switching period, the following are obtained:

$$\langle i_{dch} \rangle = ((1 - \langle S_{a_h} \rangle) \times \langle i_a \rangle) + ((1 - \langle S_{b_h} \rangle) \times \langle i_b \rangle) + ((1 - \langle S_{c_h} \rangle) \times \langle i_c \rangle) \quad (5)$$

$$\langle i_{dcl} \rangle = ((1 - \langle S_{a_l} \rangle) \times \langle i_a \rangle) + ((1 - \langle S_{b_l} \rangle) \times \langle i_b \rangle) + ((1 - \langle S_{c_l} \rangle) \times \langle i_c \rangle) \quad (6)$$

Now, the average value of the phase currents (denoted by $\langle i_a \rangle$, $\langle i_b \rangle$ and $\langle i_c \rangle$) is none other than the fundamental component of the current without the high-frequency components that are due to chopping.

This fundamental component is the current setpoint obtained from the power setpoint set by the user in the case of the Vienna bridge rectifier 20 being regulated by power factor correction PFC. However, the mean value of a switching signal denoted by $\langle S_{x_{h,l}} \rangle$ is none other than the duration of closure of the semiconductor over the switching period. The latter is known as the duty cycle and is denoted by $\alpha_{x_{h,l}}$. Consequently, equations (5) and (6) become:

$$\langle i_{dch} \rangle = ((1 - \alpha_{a_h}) \times \langle i_a \rangle) + ((1 - \alpha_{b_h}) \times \langle i_b \rangle) + ((1 - \alpha_{c_h}) \times \langle i_c \rangle) \quad (7)$$

$$\langle i_{dcl} \rangle = ((1 - \alpha_{a_l}) \times \langle i_a \rangle) + ((1 - \alpha_{b_l}) \times \langle i_b \rangle) + ((1 - \alpha_{c_l}) \times \langle i_c \rangle) \quad (8)$$

Since the objective is to obtain $\langle i_{dch} \rangle = \langle i_{dcl} \rangle$, it is sought to determine the value of the various duty cycles to be applied for each phase. Now, a duty cycle may be determined using a low-frequency signal, referred to as the "modulant" and denoted by $\text{mod}_x$, such that:

$$\alpha_x = 1 - \text{mod}_x \quad (9)$$

Consequently, equations (7) and (8) become equal to:

$$\langle i_{dch} \rangle = (\text{mod}^*_{a_h} \times \langle i_a \rangle) + (\text{mod}^*_{b_h} \times \langle i_b \rangle) + (\text{mod}^*_{c_h} \times \langle i_c \rangle) \quad (10)$$

$$\langle i_{dcl} \rangle = (\text{mod}^*_{a_l} \times \langle i_a \rangle) + (\text{mod}^*_{b_l} \times \langle i_b \rangle) + (\text{mod}^*_{c_l} \times \langle i_c \rangle) \quad (11)$$

In a modulation strategy in which the scalar approach by injecting a homopolar signal is used to formulate the law for controlling the power electronics, the "modulant" is expressed as a function of the injected harmonic component and the reference voltages generated by the closed-loop control as follows:

$$\begin{cases} \text{mod}^*_a = v^*_a + v^*_z \\ \text{mod}^*_b = v^*_b + v^*_z \\ \text{mod}^*_c = v^*_c + v^*_z \end{cases} \quad (12)$$

where:

$v^*_a$, $v^*_b$ and $v^*_c$ are the setpoint voltages normalized with respect to the voltage of the DC bus, denoted by $V_{dc}$, and belong to the interval $$\left[ -\frac{1}{\sqrt{3}}, +\frac{1}{\sqrt{3}} \right].$$

They are obtained by transforming the phase-phase voltages into phase-neutral voltages:

$$\text{mod}^*_x = \begin{cases} \text{mod}^*_{x_h} & (i_x \geq 0) \\ \text{mod}^*_{x_l} & (i_x < 0) \end{cases} \text{ with } x = a, b, c$$

where $v^*_z$ is the homopolar voltage to be injected.

Thus, in the method according to the invention, it is sought to determine the homopolar voltage $v^*_z$.

In a first step 60, the phase-phase voltages U*ab, U*ac, U*bc (setpoint voltages between phases, corresponding to the voltages between the points a and b, a and c and b and c, respectively) are transformed 60 into phase-neutral voltages v*a, v*b, v*c, also referred to as setpoint voltages v*a, v*b, v*c.

There are a number of solutions for carrying out such a transformation 60, which are known to a person skilled in the art.

In this embodiment, the problem is considered in the real space formed by the three setpoint phase-neutral voltages for the sake of simplicity.

Specifically, for a given modulation strategy, the rotating reference voltage vector is expressed, on average, as a function of the three phase-neutral voltages (for the three-phase case) denoted by $v^*_a$, $v^*_b$ and $v^*_c$.

Equation (1) is applied to obtain the three phase-neutral voltages (v*a, v*b, v*c) from the two phase-phase voltages:

$$\begin{cases} v_a^* = \frac{1}{3}(U_{ab}^* - U_{ac}^*) = \frac{v_a}{V_{dc}} \\ v_b^* = \frac{1}{3}(-2U_{ab}^* + U_{ac}^*) = \frac{v_b}{V_{dc}} \\ v_c^* = \frac{1}{3}(U_{ab}^* - 2U_{ac}^*) = \frac{v_c}{V_{dc}} \end{cases} \quad (13)$$

In a second calculation step 61, the homopolar component to be injected is calculated.

As an exemplary embodiment, the following phase-neutral voltage values are considered: ($v_a^* \geq 0$, $v_b^* < 0$ and $v_c^* < 0$).

Since the voltages and the currents are regulated by a power factor correction PFC, it is assumed that the currents and the voltages are in phase and their signs are identical.

Thus, since $i_a \geq 0$, $i_b < 0$ and $i_c < 0$, only the following diodes $D_{1h}$, $D_{2l}$ and $D_{3l}$ are turned on. Consequently, equations (1) and (2) become:

$$i_{dc_h} = (D_{ah} \times i_a) \quad (14)$$

$$i_{dc_l} = (D_{bl} \times i_b) + (D_{cl} \times i_c) \quad (15)$$

whence:

$$\langle i_{dc_h} \rangle = (\text{mod}_{a_h}^* \times \langle i_a \rangle) \quad (16)$$

$$\langle i_{dc_l} \rangle = (\text{mod}_{b_l}^* \times \langle i_b \rangle) + (\text{mod}_{c_l}^* \times \langle i_c \rangle) \quad (17)$$

By expressing equations (16) and (17) as a function of equation (12), the following are obtained:

$$\langle i_{dc_h} \rangle = ((v_a^* + v_z^*) \times \langle i_a \rangle) \quad (18)$$

$$\langle i_{dc_l} \rangle = ((v_b^* + v_z^*) \times \langle i_b \rangle) + ((v_c^* + v_z^*) \times \langle i_c \rangle) \quad (19)$$

By balancing the two equations (18) and (19), the equation for $v_z^*$ to be injected for this specific scenario ($v_a^* \geq 0$, $v_b^* < 0$ and $v_c^* < 0$) is deduced therefrom, such that:

$$v_z^* = \frac{(v_a^* \times \langle i_a \rangle) - (v_b^* \times \langle i_b \rangle) - (v_c^* \times \langle i_c \rangle)}{-\langle i_a \rangle + \langle i_b \rangle + \langle i_c \rangle} \quad (20)$$

By generalizing this over one complete electrical period, the generic equation (21) for the homopolar component to be injected is deduced therefrom:

$$v_z^* = \frac{\sigma_a.(v_a^* \times \langle i_a \rangle) + \sigma_b.(v_b^* \times \langle i_b \rangle) + \sigma_c.(v_c^* \times \langle i_c \rangle)}{-(\sigma_a.\langle i_a \rangle + \sigma_b.\langle i_b \rangle + \sigma_c.\langle i_c \rangle)} \quad (21)$$

where $\sigma_{abc} = \text{sign}(v_{abc}^*)$ such that:

| Condition | $\sigma_a$ | $\sigma_b$ | $\sigma_c$ |
|---|---|---|---|
| $v_a^* \geq 0$, $v_b^* < 0$ and $v_c^* < 0$ | + | − | − |
| $v_a^* \geq 0$, $v_b^* < 0$ and $v_c^* < 0$ | + | + | − |
| $v_a^* \geq 0$, $v_b^* < 0$ and $v_c^* < 0$ | − | + | − |
| $v_a^* \geq 0$, $v_b^* < 0$ and $v_c^* < 0$ | − | + | + |
| $v_a^* \geq 0$, $v_b^* < 0$ and $v_c^* < 0$ | − | − | + |
| $v_a^* \geq 0$, $v_b^* < 0$ and $v_c^* < 0$ | + | − | + |

Next, the "modulants" of the three phases mod*a, mod*b, mod*c are calculated from equation (12) such that:

$$\begin{cases} \text{mod}_a^* = v_a^* + v_z^* \\ \text{mod}_b^* = v_b^* + v_z^* \\ \text{mod}_c^* = v_c^* + v_z^* \end{cases} \quad (22)$$

Next, the six PWM control signals for controlling the controlled power switches Sa, Sb, Sc are generated 62 according to the signs of the phase currents, and by comparing the "modulants" mod*a, mod*b, mod*c with two synchronous carriers, which set the chopping frequency of the semiconductors at 140 kHz.

For the high switches $S_{ah}$, $S_{bh}$, $S_{ch}$ and for each arm x=a, b, c, with reference to FIG. 7:

if the sign ($i_x$)≥0, the "modulant" mod*$_x$ is compared with a symmetrical triangle-wave signal, which varies between 0 and 1, so as to generate $S_{x_h}$ and $S_{x_l}$=1.

Regarding the generation of $S_{x_h}$:

if mod$_x$ is lower than the triangle-wave signal that varies between 0 and 1, $S_{x_h}$=1;

if mod$_x$ is higher than or equal to the triangle-wave signal that varies between 0 and 1, $S_{x_h}$=0.

For the low switches $S_{al}$, $S_{bl}$, $S_{cl}$ and for each arm x=a, b, c with reference to FIG. 8:

if the sign ($i_x$)<0, the "modulant" mod*$_x$ is compared with a symmetrical triangle-wave signal, which varies between −1 and 0, so as to generate $S_{x_l}$ and $S_{x_h}$=1.

Regarding the generation of $S_{x_l}$:

if mod$_x$ is lower than or equal to the triangle-wave signal that varies between −1 and 0, $S_{x_l}$=0;

if mod$_x$ is higher than the triangle-wave signal that varies between −1 and 0, $S_{x_l}$=1.

The invention claimed is:

1. A method for controlling a three-phase Vienna rectifier, comprising a plurality of controlled power switches (Sa, Sb, Sc) that are each associated with one electrical phase; the method comprising:

transforming three supplied setpoint phase-phase voltages (U*ab, U*bc, U*ac) into three phase-neutral voltages (v*a, v*b, v*c);

calculating a homopolar component (f(3wt)) to be injected according to the values and the signs of the phase-neutral voltages (v*a, v*b, v*c) and the average values of phase currents (ia, ib, ic) of the three-phase Vienna rectifier;

calculating a modulant value (mod*a, mod*b, mod*c) for each phase of the three-phase Vienna rectifier according to the calculated homopolar component (f(3wt)) to be injected and the three phase-neutral voltages (v*a, v*b, v*c); and generating six signals for switching the controlled power switches (Sa, Sb, Sc) according to the sign of the phase currents (ia, ib, ic) of the three-phase Vienna rectifier and the calculated modulant values (mod*a, mod*b, mod*c).

2. The method as claimed in claim 1, wherein the calculating the homopolar component (f(3wt)) comprises applying the following equation:

$$f(3wt) = v_z^* = \frac{\sigma_a.(v_a^* \times \langle i_a \rangle) + \sigma_b.(v_b^* \times \langle i_b \rangle) + \sigma_c.(v_c^* \times \langle i_c \rangle)}{-(\sigma_a.\langle i_a \rangle + \sigma_b.\langle i_b \rangle + \sigma_c.\langle i_c \rangle)}$$

wherein $\sigma_{x=a,b,c} = \text{sign}(v_{x=a,b,c}^*)$ according to the values from the following table:

| Condition | $\sigma_a$ | $\sigma_b$ | $\sigma_c$ |
|---|---|---|---|
| $v_a^* \geq 0, v_b^* < 0$ and $v_c^* < 0$ | + | − | − |
| $v_a^* \geq 0, v_b^* < 0$ and $v_c^* < 0$ | + | + | − |
| $v_a^* \geq 0, v_b^* < 0$ and $v_c^* < 0$ | − | + | − |
| $v_a^* \geq 0, v_b^* < 0$ and $v_c^* < 0$ | − | + | + |
| $v_a^* \geq 0, v_b^* < 0$ and $v_c^* < 0$ | − | − | + |
| $v_a^* \geq 0, v_b^* < 0$ and $v_c^* < 0$ | + | − | +. |

3. The method as claimed in claim 1, wherein each modulant value (mod*a, mod*b, mod*c) is calculated by adding the homopolar component (f(3wt)) to the associated phase-neutral voltage (v*a, v*b, v*c).

4. The method as claimed in claim 1, wherein the generating the six signals for switching the controlled power switches (Sa, Sb, Sc) comprises comparing the modulant values (mod*a, mod*b, mod*c) with two high-frequency carriers that are synchronized and in phase with one another.

5. The method as claimed in claim 4, wherein, for each phase of the Vienna rectifier, when the phase current is positive, the modulant associated with the phase is compared with a symmetrical triangle-wave signal varying between 0 and +1.

6. The method as claimed in claim 4, wherein, for each phase of the Vienna rectifier, when the phase current is negative, the modulant associated with the phase is compared with a symmetrical triangle-wave signal varying between −1 and 0.

7. A device for controlling a three-phase Vienna rectifier comprising:
   means for implementing the method as claimed in claim 1.

* * * * *